(No Model.)
B. A. OSGOOD.
APPARATUS FOR PURIFYING ALCOHOLIC LIQUORS.
No. 244,476. Patented July 19, 1881.
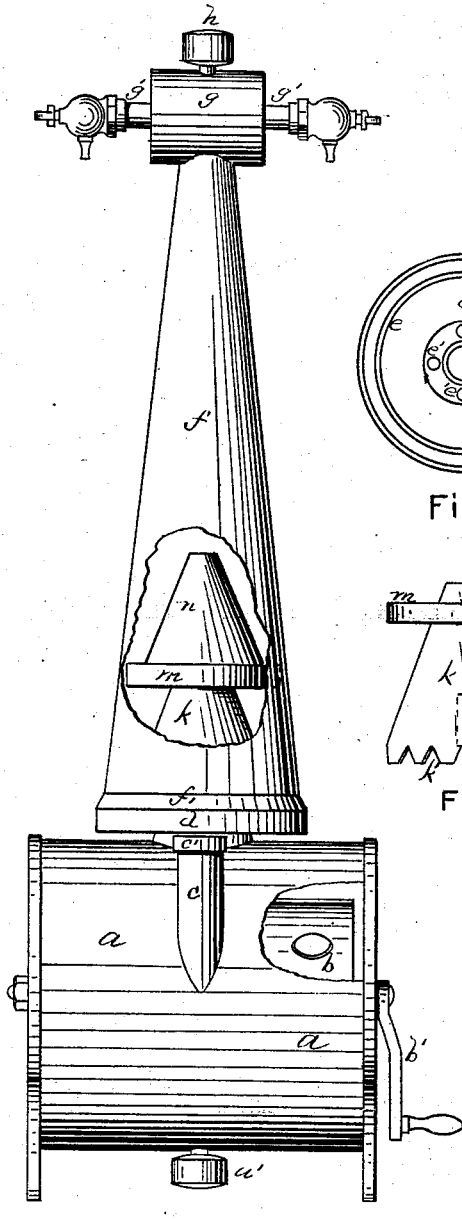
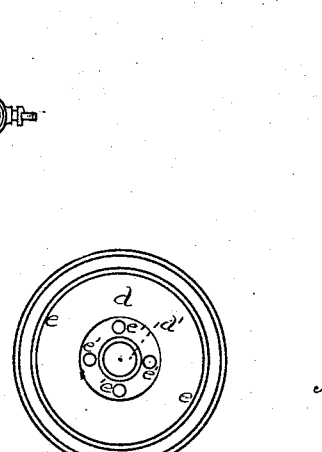
Fig. 3.
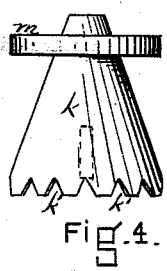
Fig. 4.
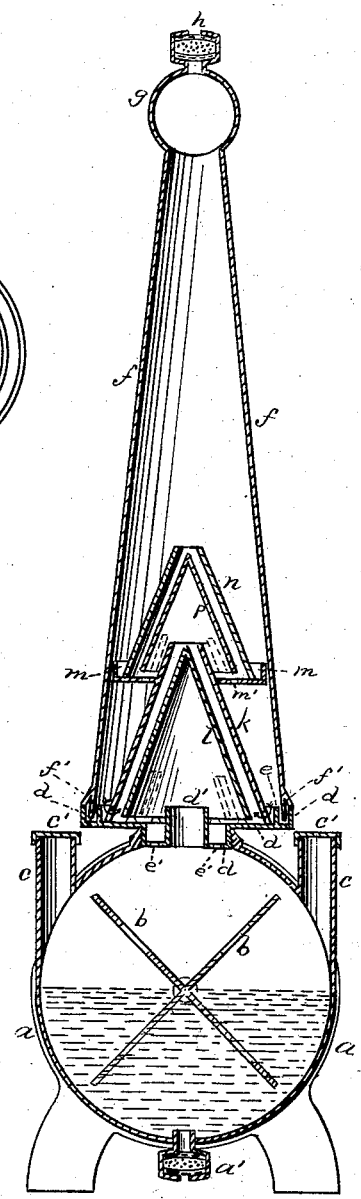
Fig. 1. Fig. 2.
WITNESSES
B. W. Williams
George V. Mallon
Byron A. Osgood INVENTOR
By his Atty.
Henry W. Williams

UNITED STATES PATENT OFFICE.

BYRON A. OSGOOD, OF WAKEFIELD, MASSACHUSETTS, ASSIGNOR TO THE PURIFYING AND MATURING PROCESS COMPANY, OF HARTFORD, CONN.

APPARATUS FOR PURIFYING ALCOHOLIC LIQUORS.

SPECIFICATION forming part of Letters Patent No. 244,476, dated July 19, 1881.

Application filed November 22, 1880. (No model.)

*To all whom it may concern:*

Be it known that I, BYRON A. OSGOOD, of Wakefield, in the county of Middlesex and State of Massachusetts, have invented a new and Improved Apparatus for Purifying Alcoholic Liquors, of which the following is a specification.

In the accompanying drawings, in which similar letters of reference indicate like parts, Figure 1 is an elevation of my improved apparatus, certain portions being represented as broken out, the better to exhibit the invention. Fig. 2 is a cross vertical section of the same. Fig. 3 is a plan of the pan *d*. Fig. 4 is an elevation of the cone *k* detached.

*a* is a retort, which, when in use, is kept one-half full of liquor by the use of a suitable gage, and at a proper temperature, varying from 70° to 215° Fahrenheit. At its outlet a filter, *a'*, is provided. One or more escape-pipes, *c*, provided with caps *c'*, extend upward from the retort.

*b* is a perforated agitator operated by the crank *b'* or by any power.

Into an opening upon the upper side of the retort is set the pan *d*, which is sunken at its center, the sunken portion being provided with the pipe *d'* and perforations *e'*. An annular partition, *e*, is provided, thus forming a reservoir or tank between it and the outer wall of the pan, which is kept full of alcohol.

Resting upon the wall or rim of the pan *d* by means of the flange *f'* is the tall conductor *f*, surmounted by a barrel-shaped tank or vessel, *g*, having opposite faucets *g'* and supporting a filter, *h*.

Resting on the pan *d*, inside the partition *e*, is the hollow cone or conical pipe *k*, open at the top and having notches *k'* cut in its lower edge. Within and fixed to the cone *k* is a smaller cone, *l*, closed at the top and having its lower edge higher than the lower edge of cone *k*, hence not resting on the pan *d*. A pan, *m*, is secured to the upper portion of the cone *k* surrounding it, and having perforations *m'*. Set in this pan is the open-topped outer cone, *n*, to which is secured the close-topped inner cone, *p*, whose lower edge is raised above the pan *m*. This cone *n* may support a pan and a pair of cones similar to cones *n p*, and so on, as many being used as desired.

The operation is as follows: The liquor to be purified is conducted by means of a tube or pipe from a point above the apparatus to the opening in the top of the filter *h*; thence it passes through said filter into the tank *g*; thence through a central opening in said tank. The liquor drops through the open top of the outer cone, *n*, flows around the outside of the inner cone, *p*, through the perforated pan *m* to the outside of the outer cone, *k*, thence through the notches *k'* into the pan *d*, and through the openings *e'* into the retort. There the liquor is violently agitated in order to produce thorough internal evaporation without ebullition. As above stated, the retort is kept one-half full and agitation is not usually commenced until that amount of liquor has passed into the retort. The heat applied to the retort is graded to the evaporation of different ethers of liquors. The vapor rises through tube *d'* in pan *d*, passes into the inner cone, *l*, partially condenses on its inner surface, then passes between the inner cone, *l*, (having passed down under its lower edge,) and the outer cone, *k*, through the opening in its top into inner cone, *p*, partially condenses on its inner surface, passes down under its lower edge, up between it and the outer cone, *n*, up through its top opening, and pursues the same course with what other similar cones there may be. Thence the vapor passes through conductor *f*, tank *g*, and filter *h* to the original barrel or tank, which ultimately becomes full of vapor instead of liquor.

By means of the faucets *g'* the more pungent vapors may be drawn off without passing into the barrel.

The heavier ethers in passing up from the retort can be absorbed by the alcohol in the space between the partition *e* and the side of the pan *d*, having access thereto through the notches *k'*.

Instead of alcohol, other absorbents, such as glycerine, charcoal, fibrine, &c., can be used.

The caps *c'* having been removed and the mouths of the tubes *c* covered with animal membrane, the lighter ethers may pass out from the retort on the exosmose principle, which having been accomplished, the caps may be again placed in position to prevent the absorption of oxygen. These evaporating-tubes $c$ may be more or less in number.

Having thus fully described my invention, what I claim, and desire to secure by Letters Patent, is—

1. The herein-described improved apparatus for purifying liquors, the same consisting of the retort $a$, having evaporating-tubes $c$ and pan $d$, constructed as shown, the conductor $f$, containing two or more sets of inner and outer cones, $k\,l$ and $n\,p$, each outer one provided with a perforated pan, $m$, and the tank $g$, having faucets $g'$, all constructed and arranged substantially as and for the purposes set forth.

2. The pan $d$, having a central depression, and provided with tube $d'$, perforations $e'$, and annular partition, $e$, in combination with the retort and lower set of cones, substantially as and for the purpose described.

3. The combination of the outer cone, $k$, having notches $k'$, and supporting the perforated pan $m$, and the inner cone, $l$, secured to the outer cone and having its lower edge raised above the pan upon which the outer cone rests, the outer cone being open and the inner cone closed at the top, all substantially as and for the purpose specified.

4. In combination with the set of cones $k\,l$ and pan $m$, the similar set of cones $p\,n$, supported by said pan, substantially as and for the purpose set forth.

BYRON A. OSGOOD.

Witnesses:
   HENRY W. WILLIAMS,
   GEORGE V. MALLON.